United States Patent [19]

Bourdon

[11] Patent Number: 5,249,945

[45] Date of Patent: Oct. 5, 1993

[54] APPARATUS FOR COVERING AT LEAST TWO CORES WITH THE SAME JACKETING MATERIAL

[75] Inventor: Raymond Bourdon, Monein, France

[73] Assignee: Elf Atochem S.A., Puteaux, France

[21] Appl. No.: 846,908

[22] Filed: Mar. 6, 1992

[30] Foreign Application Priority Data

Mar. 8, 1991 [FR] France .............................. 91 02836

[51] Int. Cl.$^5$ ............................................. B29C 47/28
[52] U.S. Cl. ................................. 425/114; 264/40.7;
264/174; 425/146; 425/192 R; 425/378.1;
425/382 R; 425/464
[58] Field of Search ............ 264/174, 136, 40.7;
425/114, 113, 462, 463, 464, 185, 192 R, 382 R,
378.1, 146

[56] References Cited

U.S. PATENT DOCUMENTS

| | | | |
|---|---|---|---|
| 3,046,602 | 7/1962 | Houvener | 425/464 |
| 3,589,163 | 6/1971 | Byrne et al. | 425/185 |
| 4,122,145 | 10/1978 | Hartmann | 425/114 |
| 4,134,715 | 1/1979 | Cueto | 425/114 |
| 4,182,601 | 1/1980 | Hill | 425/382.3 |
| 4,609,515 | 9/1986 | Smyth | 264/136 |
| 4,699,579 | 10/1987 | Bourdon et al. | 264/174 |
| 4,761,129 | 8/1988 | Aste et al. | 264/174 |
| 4,864,964 | 9/1989 | Hilakos | 264/136 |
| 4,902,453 | 2/1990 | Okura et al. | 264/136 |

FOREIGN PATENT DOCUMENTS

| | | |
|---|---|---|
| 0188939 | 7/1986 | European Pat. Off. |
| 49-25988 | 7/1974 | Japan ........................ 425/114 |

*Primary Examiner*—Jeffery Thurlow
*Attorney, Agent, or Firm*—Burns, Doane, Swecker & Mathis

[57] ABSTRACT

A plurality of cores are covered with the same jacketing material by passing the cores through respective dies of a plate, while flowing the jacketing material through sub-channels in the plate and into coating relationship with the cores. Any of the sub-channels can be shut off by diverting the jacketing material a flow diverting path without affecting the flow in the other sub-channels.

15 Claims, 3 Drawing Sheets

APPARATUS FOR COVERING AT LEAST TWO CORES WITH THE SAME JACKETING MATERIAL

BACKGROUND OF THE INVENTION

1. Field of the Invention

The invention relates to methods and apparatus for covering a core with a jacketing material as the core passes through a tool such as a die.

2. Description of the Prior Art

It is known to jacket a complex material comprised of a plastic jacket and a core which is sensitive at the extrusion temperature of the jacket. It is also known to jacket a metal core, especially an electrical cable, by extrusion.

All the known processes for carrying out these jacketing operations only carry out the jacketing of a single core. In order to cover several different (or identical) cores with the same jacketing material, it is necessary to stop the extrusion of the jacket in order to clean, or indeed change, the die. It may also be necessary to stop the jacketing operation to modify the parameters of the extruder and of the attached equipment.

SUMMARY OF THE INVENTION

The present invention relates to a device adaptable to any system which supplies the device with molten material, and wherein the device is capable of receiving at least two tools, such as dies.

The invention concerns more particularly an extruder head, called a multi-function head, making it possible to receive at least two dies traversed by identical or different cores and enabling all of the cores to be covered by the same jacketing material.

The cores may be constituted by fluid or solid materials capable of passing through the die.

The jacketing or covering material may comprise any material capable of being extruded or which can be made into a film.

This device and the process which results therefrom are especially applicable to the manufacture of at least two complex materials comprised of identical or different cores made from plastic material, possibly reinforced by fibers, and which are coated by the same jacketing material. That jacketing material preferably comprises a thermoplastic resin whose melting point is substantially in the vicinity of or greater than that of the constituent materials of the cores.

The constituent materials of the cores may be thermoplastic resins which are identical to or different from those constituting the jacketing material.

The apparatus comprises a plate having at least two cavities for supporting a tool through which a core may pass. A main channel extends into the plate and is adapted to be connected to an extruder for receiving a flow of jacketing material At least two sub-channels extend from the main channel to respective ones of the cavities.

Preferably, the plate comprises two plate sections joined together.

A valve is preferably disposed in each sub-channel for controlling the flow of jacketing material. A flow diverting path preferably communicates with each sub-channel. Each valve is operable to divert the flow of jacketing material from its associated tool to its associated flow diverting path to terminate the flow of jacketing material to the associated tool without affecting the flow of jacketing material to another tool.

The present invention also relates to a process of covering at least two cores with the same jacketing material. The process comprises passing the cores through respective tools mounted in a plate while flowing a plastic resin through the plate and the tools and into covering relationship with the cores.

BRIEF DESCRIPTION OF THE DRAWINGS

The objects and advantages of the invention will become apparent from the following detailed description of the preferred embodiment thereof in connection with the accompanying drawings, in which like numerals designate like elements, and in which.

DETAILED DESCRIPTION OF THE PREFERRED EMBODIMENTS OF THE INVENTION

Figure 1:
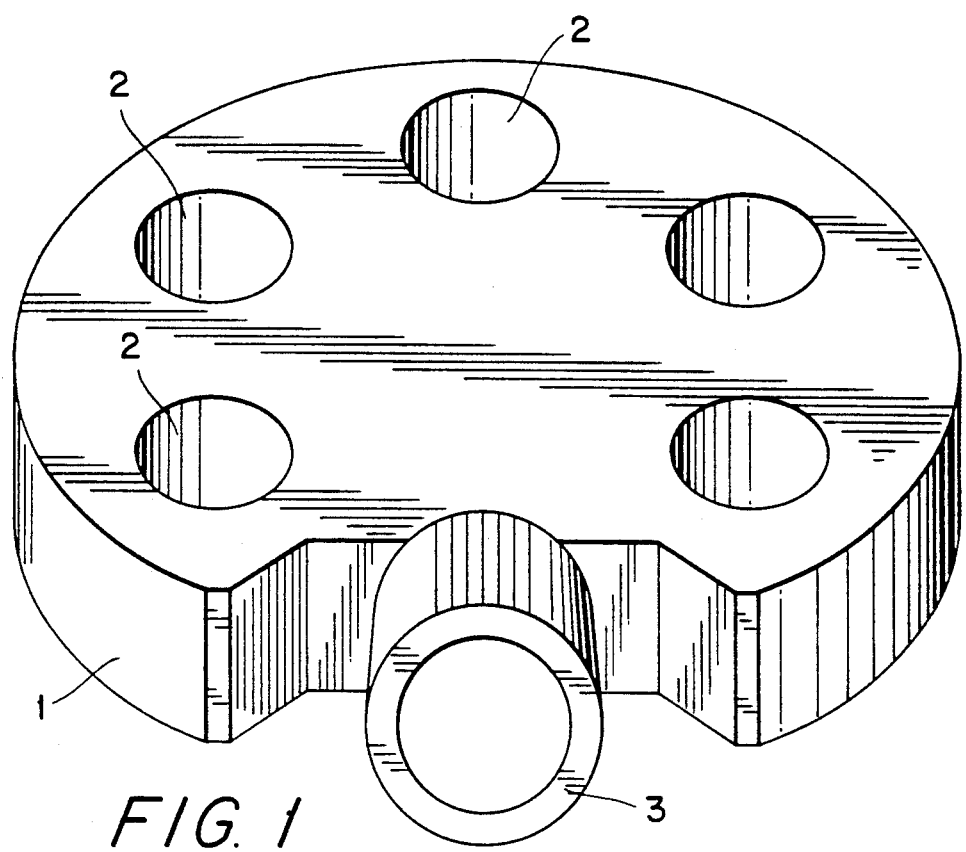
FIG. 1 is a perspective view of a core-jacketing plate according to a first embodiment of the invention.

A jacketing device comprises a substantially cylindrical plate 1 in which at least two cavities 2 of substantially cylindrical shape are formed. A junction tube or pipette 3 is disposed in the plane of the plate and is bolted into the body of the plate I.

The junction tube 3 makes it possible to link the plate with at least one extruder, or with any system supplying the plate with molten jacketing material. The junction tube 3 communicates with a central channel 4 located inside of the plate and which extends to the center of the plate.

According to the invention, each cavity may receive a die F which can be combined with an injector and with a system for conditioning the jacket.

Each cavity 2 may especially receive a tool such as described in European Patent 188,939 whose content is incorporated by reference herein.

Figure 2:
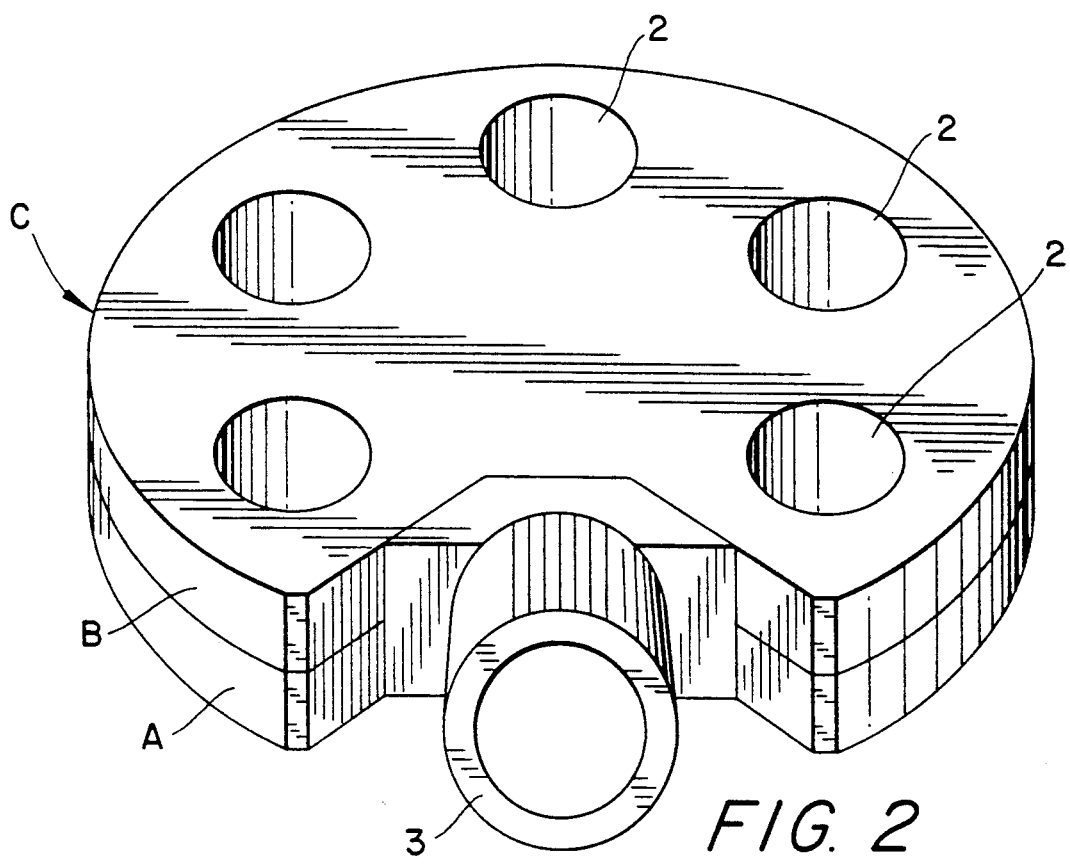
FIG. 2 is a view similar to FIG. 1 of a second embodiment of the invention.
Figure 3:
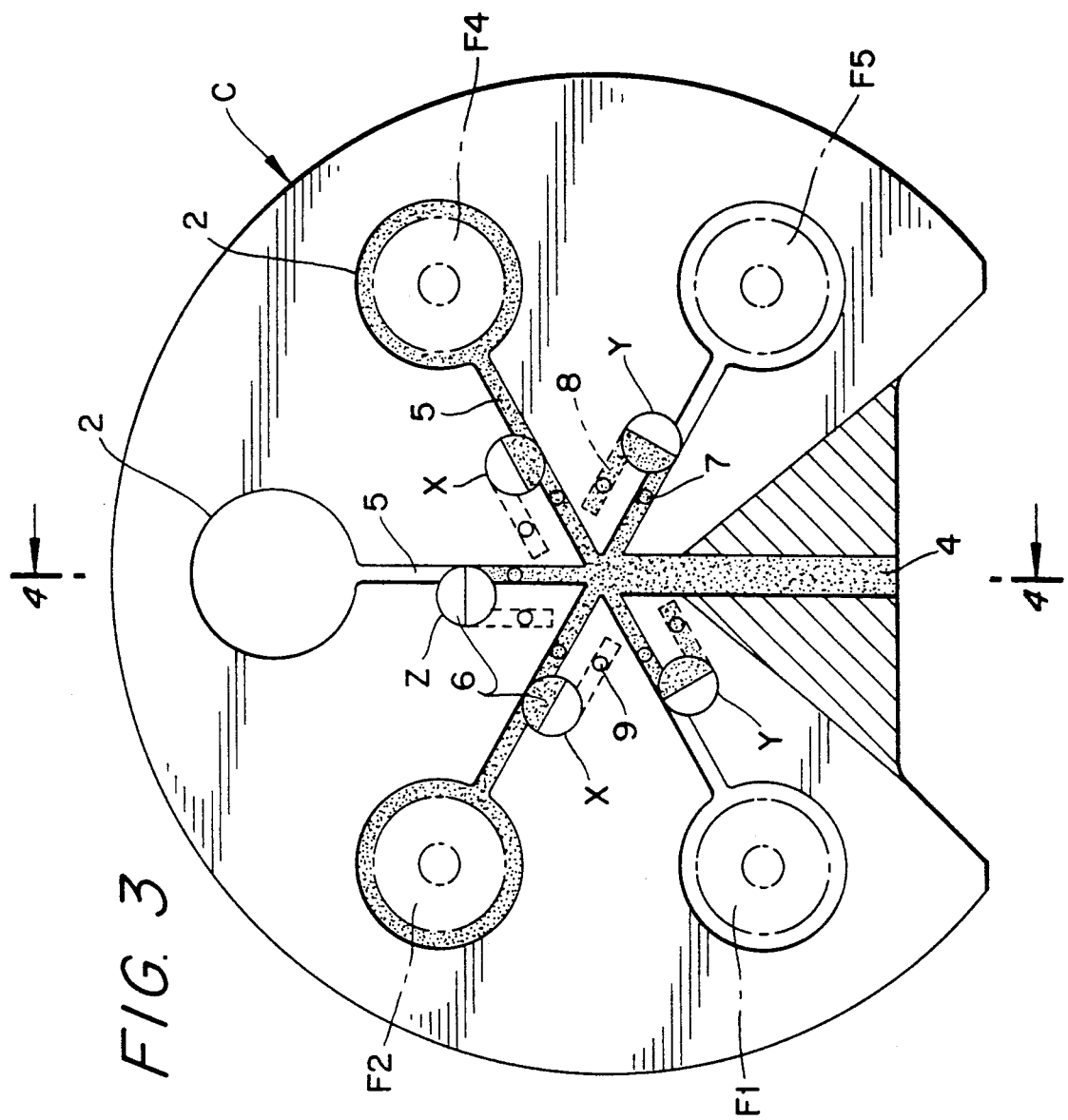
FIG. 3 is a sectional view taken along the line 3—3 in FIG. 4 with the pipette removed.
Figure 4:
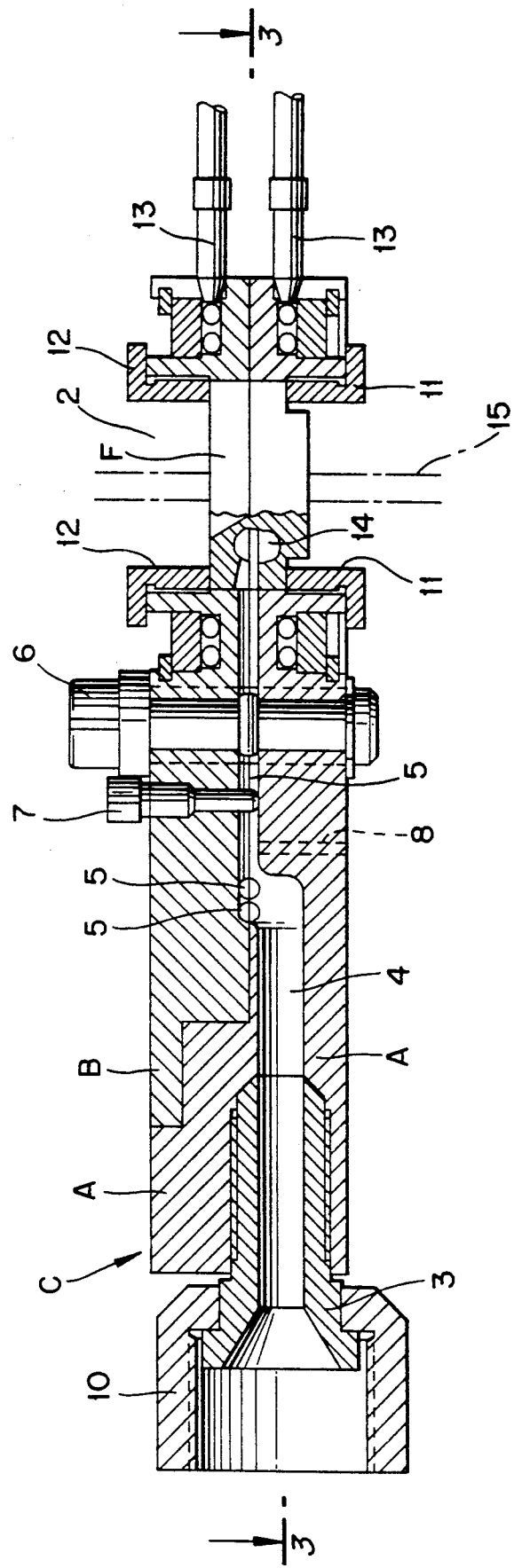
FIG. 4 is a sectional view taken along the line 4—4 in FIG. 3.

A more preferred embodiment of the invention is depicted in FIGS. 2-4 wherein the device comprises two substantially cylindrical plate sections A and B which fit against each other in order to form a plate C such as shown diagrammatically in FIG. 2.

In this device, the junction tube or pipette 3 may advantageously be fixed to the circumferential edge of the lower plate section A. The central channel 4 is also formed in that lower plate section A. The axial lengths of the cavities 2, however, are formed partially by each of the plate sections A, B, as is shown in FIG. 3.

The cavities 2 may be disposed at the periphery of the plate C in a circular arrangement as shown in FIGS. I and 2.

Each cavity 2 is connected to the main or central channel 4 via a sub-channel 5, the circumference of which is formed partially by each plate section A, B. The sub-channel 5 may be provided with a valve in the form of a purge key 6 and at least one micrometer screw 7, enabling the flow rate of the jacketing material to be regulated at the entry of the feed system of the die.

Each sub-channel 5 may be provided with a pressure indicator located preferably between the micrometer screw 7 and the purge key 6.

The purge keys 6 communicate with respective flow diverting paths 8, shown in broken lines in FIG. 3. Each path 8 is provided with a purge flow rate-limiting micrometer screw 9 which keeps the pressure constant in the sub-channel 5 downstream of the screw 7 and cancels the flow which exists in the "working" purge-key position.

The plate 1 may be fixed to the exit of an extruder by means of a clamping or coupling nut 10 (shown in FIG. 4) which engages the pipette 3 bolted to the plate A, thus producing a leak-tight linkage between the barrel of the extruder and the main or central feed channel 4 while allowing a rotational freedom of the plate about the axis of the pipette 3.

According to the invention, the number of cavities 2 in which a die F, or any other tool, may be received is at least two. However, depending on the type and complexity of the cores to be jacketed, it is possible to envisage a greater number of cavities, and it would not be outside the scope of the invention if this number were greater than 10. With a concern for clarity, the device shown in FIGS. 1, 2 and 3 comprises only five cavities.

Each die F and/or other tool is adjusted in the cavity in such a manner that the axis of the sub-channel 5 is aligned with the entry hole 14 of the die F. For this purpose, lower and upper clamping nuts 11, 12 are used so as to position the die-entry hole 14 opposite the entry channel for the infeed of the covering material. These two nuts are then locked in order to immobilize the die in its cavity.

The device according to the invention may carry out, equally well, the covering of cores 15 traveling downwards or upwards through the die.

The purge keys 6 may assume several positions X, Y, Z as shown in FIG. 3 to control the flow of jacketing material.

When the purge key 6 is in a "die feed" position shown in FIG. 3, the purge key 6 unblocks the associated sub-channel 5 and blocks the associated path 8. Hence, the flow of jacketing material issuing from an extruder and flowing through the pipette 3 and then through the central channel 4 may enter a die F by way of the sub-channel 5. This applies, for example, to the dies F2 and F4 of FIG. 3.

When the purge key 6 is in an "individual purge" position Y shown in FIG. 3 the purge key 6 communicates the associated sub-channel 5 with the associated path 8. Therefore, the flow of jacketing material is diverted from the sub-channel 5 to the path 8 (or to some other path if provided). This is the case, for example, for the sub-channels leading to the dies F1 and F5 of FIG. 3. The jacketing material traveling in this path 8 may advantageously be recycled, especially back into the extruder. Thus, the paths 8 may include individual outlets, or a common outlet which open at a side or circumferential edge of the plate C, and suitably coupled to the extruder.

The ability to divert the flow of jacketing material to the path 8 enables the parameters of the flow-blocked dies F1, F5 to be modified if required, without halting or modifying the flow of jacketing material being fed to the other dies F2, F4. The overall flow rates and/or pressures of the material fed to dies F2, F4 are thus maintained.

When the purge key 6 is in a "closed" position Z shown in FIG. 3, the associated sub-channel 5 is completely closed. This case occurs when the corresponding cavity 2 is not provided with a die or other tool, or whenever the operation of the sub-channel 5 corresponding to this cavity is desired to be stopped for any reason.

The purge keys 6 may also assume intermediate positions between the positions X, Y and Z to regulate the flows to the dies. The flow rate-limiting function of the micrometer screws 7 may be performed as well by the purge key itself, thus acting as a "servo-valve".

According to the device in accordance with the invention, a die and/or tool change operation does not involve stopping the whole system. Also, the flow rate to the other dies is not adversely affected because when a purge key 6 is in the purge position Y, the flow of material through the respective path 8 will simulate the flow rate which had been flowing to the die. Hence, the still-functioning dies will not "feel" any affects of the shut-down of another die when the purge key associated with the latter is maneuvered to an individual purge position.

Advantageously, all or part of the closing and opening operations of the purge keys and of the micrometer screws may be regulated automatically.

The cavities of the multi-function head may be provided with heating systems 13 constituted especially by electrical resistance elements which may be modulated together or separately, thus providing a possible temperature gradient adjusted to each die and/or tool.

By means of the device in accordance with the invention, it is possible to manufacture at least two complex materials each covered by the same jacketing material (e.g., a plastic resin) and containing identical or different cores.

According to the technique in question, all extrudable or film-formable plastic resins may be suitable for covering the cores.

They may, for example, be chosen from the group selected from vinyl, styrene, acrylic or methacrylic, olefin polymers or copolymers, or also from fluorinated resins, polyamides, polyesters, polycarbonates, cellulose propionates, polyphenylenesulphones, polyamideimides, polyimides, polyetherimides, polyethersulphones, polyetheretherketones and mixtures of these compounds as well as any film-formable substance.

The jacket may be constituted from a mixture of plastic resin and additives such as colorants, mineral or vegetable flours having complementary properties with respect to the constituents of the core.

The materials used for the core may be chosen from fluid or solid materials capable of flowing through a die and/or tool.

The core may be constituted by metallic, organic, inorganic and vegetable filaments, fibers and powders, and by mixtures of these various constituents.

The materials used for the core may also be chosen from extrudable plastic resins used for the jacketing material.

By way of illustration of organic fibers which can be used in order to constitute the core, polyamide, polyester, polyaryl and polyfluorinated fibers will be mentioned.

By way of illustration of metallic filaments or fibers which can be used in order to constitute the core, copper, aluminum and iron filaments, as a continuous length or broken up intermittently, will be mentioned.

By way of illustration of vegetable fibers which can be used in order to constitute the core, cotton, wool, flax, hemp, silk and wood fibers will be mentioned.

By way of illustration of inorganic fibers which can be used in order to constitute the core, glass fibers, carbon fibers, ceramic fibers, especially fibers based on boron and silicon nitride, will be mentioned.

The organic and/or inorganic fibers may be impregnated with solid, porous or hollow fillers which may be constituted by powders, balls or lamellae, the fillers being organic, metallic or inorganic.

By way of illustration of such fillers, capable of impregnating the organic and/or inorganic fibers which can be used in order to constitute the core, polyamide or polymethyl methacrylate powders, glass or metal balls, graphite powders, metallic powders, such as molybdenum sulphide, glass spheres and metal spheres will be mentioned.

The process according to the invention is particularly suitable for jacketing cores which are sensitive at the extrusion temperature of the single jacketing material.

Such sensitive cores may be constituted, partially or completely, from inert and/or reactive powders and from active substances.

Concerning reactive powders, catalyst powders, blowing agents, enzyme powders, oxidizable powders, such as food powders, microorganism powders, yeasts and mixtures of these various constituents, will be mentioned.

Concerning active substances, essential oils, plant essences and volatile or non-volatile fluid products will be mentioned.

Thus, for medical applications especially, it is possible to produce a complex material constituted from a jacket, made from polyolefin loaded with vegetable flour, such as corn flour, and from a core made from mineral powder impregnated with microorganisms.

The jacketing material may be the same as, or different from the core material, depending on the core to be jacketed.

The thickness of the covering jacket is limited by the properties of the extrudable or film-formable material. In jacketing applications, such thickness does not usually exceed one millimeter. It is possible for the thickness to be thicker in other applications.

The diameter of the complex material produced by the process may vary widely. For composites, this diameter is not less than 0.1 mm and, preferably, lies between 0.5 and 5 mm.

The following example illustrates the invention:

Starting with a single-screw type extruder of B30-20D diameter, provided with a multi-function head, equipped in accordance with the invention with 5 dies as described in European Patent 188,939, a jacket of polypropylene (homopolymer of propylene of melt index equal to 35 g/10 min, measured at 230° C. with a load of 2.16 kg) is extruded at a temperature of 215° C. and an extrusion rate of 100 meters per minute in order to cover, respectively, the following cores:
die 1 : 320 tex glass fiber
die 2 : 320 tex glass fiber impregnated with FORAFLON PVDF Powder
die 3 : 160 tex glass fiber impregnated an ORGASOL 2002.D Nat polyamide powder
die 4 : 420 tex glass fiber impregnated with polyamide powder (identical to that of the jacketed material in die 3).
die 5 : 320 tex glass fiber.

The pressure of the dies lies between 5 and 30 bar.

For the dies 1, 2, 3 and 5, the core is directed downwards and for the die 4 the core is directed upwards.

The rate of haul-off of the product from each die is a function of the desired thickness and is on the order of 70 to 200 m/min.

The trial lasted 30 min. In Table I hereinbelow are indicated the weight percentage of fiber, powder and jacket in the finished material.

TABLE I

| Product From the Die | Fiber | Powder | Jacket |
|---|---|---|---|
| 1 | | | |
| 2 | 67 | 15 | 18 |
| 3 | 57 | 12 | 31 |
| 4 | 77 | 13 | 10 |
| 5 | | | |

While the invention has been described in terms of the preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Apparatus for jacketing at least two cores with the same jacketing material comprising a plate having at least two cavities extending completely therethrough, at least two tools supported in respective cavities, said tools including means for accommodating the passage of cores therethrough, a main channel disposed in said plate and adapted for connection to an extruder for receiving therefrom a flow of jacketing material, at least two sub-channels disposed in said plate and extending from said main channel to respective tools for conducting jacketing material from said main channel to said tools for application to cores passing through said tools, a hollow junction tube attached to said plate and having an inner end extending into said plate such that a hollow interior of said junction tube coincides with said main channel, said junction tube having an outer end, coupling means disposed on said outer end for making connection with an extruder.

2. Apparatus according to claim 1, wherein said plate comprises two plate sections joined together.

3. Apparatus according to claim i including a valve disposed in each sub-channel for controlling the flow of jacketing material.

4. Apparatus according to claim 3, wherein each sub-channel is formed with a micrometer screw spaced from said valve.

5. Apparatus according to claim 3 including a flow diverting path communicable with each sub-channel, each valve being operable to divert the flow of jacketing material from its associated tool to its associated flow diverting path to terminate the flow of jacketing material to the associated tool without affecting the flow of jacketing material to another said tool.

6. Apparatus according to claim 5 including a purge-flow rate limiting means in each of said flow diverting paths.

7. Apparatus according to claim 6, wherein said purge-flow rate limiting means comprises a micrometer screw.

8. Apparatus according to claim 1 including heating mean for heating said cavities.

9. Apparatus according to claim 1, wherein each of said tools includes an inlet, said plate provided with means for aligning said inlet with an outlet of an associated sub-channel.

10. Apparatus according to claim 1, wherein said tools comprise dies.

11. Apparatus according to claim 1 wherein said coupling means comprises a rotary nut.

12. Apparatus for jacketing at least two cores with the same jacketing material comprising a plate having at least two cavities extending completely therethrough, at least two tools supported in respective cavities, said tools including means for accommodating the passage of cores therethrough, a main channel disposed in said plate and adapted for connection to an extruder for receiving therefrom a flow of jacketing material, at least two sub-channels disposed in said plate and extending from said main channel to respective tools for conducting jacketing material from said main channel to said tools for application to cores passing through said tools, said plate comprising two plate sections joined together such that each of said sub-channels has a portion of its circumference disposed in one plate section and the rest of its circumference disposed in the other plate section, and each of said cavities has one portion of its axial length disposed in one plate section and the rest of its axial length disposed in the other plate section.

13. Apparatus according to claim 12 wherein said main channel is disposed entirely in one of said plate sections.

14. Apparatus according to claim 12 including a hollow junction tube attached to said plate and having an inner end extending into said plate such that a hollow interior of said junction tube coincides with said main channel, said junction tube having an outer end, coupling means disposed on said outer end for making connection with an extruder.

15. Apparatus for jacketing at least two cores with the same jacketing material comprising a plate having at least two cavities extending completely therethrough, at least two tools supported in respective cavities and including means for accommodating the passage of cores therethrough, a main channel disposed in said plate and adapted to be connected to an extruder for receiving therefrom a flow of jacketing material, at least two sub-channels disposed in said plate and extending from said main channel to respective tools for conducting jacketing material from said main channel to said tools for application to cores passing through said tool, at least two flow diverting paths disposed in said plate and communicating with respective sub-channels, and at least two valves disposed in respective sub-channels for diverting the flow of jacketing material from its associated tool to a respective flow diverting path without affecting the flow of jacketing material to another said tool.

* * * * *